United States Patent [19]

Bennett

[11] 4,260,247
[45] Apr. 7, 1981

[54] INSTANT PRINT SLIDE PROJECTOR

[75] Inventor: Frank P. Bennett, Franklin Lakes, N.J.

[73] Assignee: GAF Corporation, Wayne, N.J.

[21] Appl. No.: 47,634

[22] Filed: Jun. 11, 1979

[51] Int. Cl.³ .............................................. G03B 13/28
[52] U.S. Cl. ........................................ 355/45; 355/27; 355/43
[58] Field of Search ............................. 355/27, 43, 45

[56] References Cited

U.S. PATENT DOCUMENTS

| 3,515,477 | 6/1970 | Hein et al. ........................... 355/45 X |
| 3,548,730 | 12/1970 | Verge ................................... 355/45 X |
| 3,663,101 | 5/1972 | Vor Grabe ............................. 355/45 |
| 4,082,446 | 4/1978 | Driscoll et al. ...................... 355/45 X |

*Primary Examiner*—Richard A. Wintercorn
*Attorney, Agent, or Firm*—James Magee, Jr.; J. Gary Mohr

[57] ABSTRACT

An instant print slide projector is provided for sequentially displaying a plurality of photographic images on a remote screen one at a time and selectively copying one or more of said images on self-developing photographic print film. In addition to conventional slide projector components, the invention also includes means for holding a pack of instant print film, a camera lens for selectively focusing the image from a transparency on the photosensitive surface of the film, a shutter to normally prevent light from entering the camera lens, and image directing means for intercepting the image and creating an optical path for the same to the film surface. In the preferred embodiment the camera lens and the image directing means are selectively movable between a first position spaced apart from the optical axis of the projector to permit normal projection of the transparency image on the screen, and a second or print position in which the image directing means is juxtaposed along the optical axis to intercept the image, and the camera lens is positioned to focus such image on the instant print film. Means are also provided to actuate the shutter to expose the film upon movement of the light directing means into the print position.

8 Claims, 12 Drawing Figures

INSTANT PRINT SLIDE PROJECTOR

BACKGROUND OF THE INVENTION

The popularity of instant print cameras has increased due to their convenience, especially those which discharge a photographic color print of a subject within seconds of exposure. However, since the cost of instant print film greatly exceeds that of color transparency film, the average consumer or amateur photographer often prefers the lower cost film in those instances where a great many photographs are to be taken, such as on a vacation tour. Of course, prints can be made of selective transparencies when desired, but the available procedures to accomplish this have been relatively inconvenient and expensive and consist primarily of either utilizing the services of a commercial photo processor or employing an instant print camera having a specially constructed adaptor for receiving a transparency to be copied.

The present invention satisfies a long felt need by providing an instant print slide projector adapted to sequentially or randomly display a plurality of slide transparencies one at a time on a remote screen and selectively record the image of any one of said transparencies on instant print photographic film, without removing the slide from the projector and without significantly disrupting the viewing process.

SUMMARY OF THE INVENTION

The instant print slide projector of the present invention includes all of the features and functions of a conventional slide projector with the added capability of producing an immediate permanent record of the image of any desired slide. This is accomplished in a device that need not be, and preferably is not, any larger or more complex than a conventional slide projector, and is thus convenient for the average amateur photographer. The present invention is used in the same manner as a conventional slide projector by projecting the image of each successive slide upon a remote screen. Whenever a print of the image being displayed upon the screen is desired, the operator initiates the actuation of mechanisms which redirect the optical path of the projected image to photosensitive print film. With the use of self-developing print film and the appropriate drive means as incorporated in the preferred embodiment, a print of the desired image is forthwith discharged from the projector. The projected image then reappears on the screen for normal viewing. The invention represents a significant improvement in the art in that it provides means by which the amateur photographer may view and copy slides at a nominal expense with no inconvenience or delay.

To accomplish the foregoing, the projector is equipped with means for holding a pack of instant print photographic film, drive means for discharging each print after exposure, a copy or camera lens for focusing the image of the slide to be reproduced upon the photosensitive surface of the print film, and light directing means for creating an optical path from the slide holding gate of the projector to the surface of the film. A shutter to normally close the copy lens is also included, as well as means for moving the light directing means into a position to intercept the image of the transparency and to actuate the shutter.

In the preferred embodiment, the instant print slide projector of the present invention comprises, in combination, a projector housing having means to receive a slide tray of the type, adapted to hold a plurality of photographic slide transparencies, a projection gate disposed within the housing for receiving slide transparencies one at a time from a tray, changer means for transporting each slide back and forth between a tray and the projection gate, a projection lens disposed within the housing and definining an optical path from the projection gate to a remote screen, a projection lamp disposed within the housing to illuminate a slide within the projection gate, means for holding a pack of instant print photographic film, a camera lens for selectively focusing the image of a transparency disposed within the projection gate on the photosensitive surface of the film, a shutter to normally close the camera lens, image directing means for selectively intercepting the image of a transparency disposed within the projection gate and creating an optical path for the same to the film surface, and means for actuating the shutter to expose the film upon the interception of the image by the light directing means.

The slide projecting portion of the invention can be of any conventional design incorporating means for receiving a slide tray, a projection lamp, a projection gate, a projector lens, and slide changing means. In addition, the projector may be constructed of any desired format for receiving either horizontally or vertically disposed circular slide trays or rectangular box-type trays. Other slide projector features such as remote control, automatic focusing and random access can also be provided.

It is desired that the instant print film utilized in conjunction with this invention be of the type consisting of individual self-developing sheets containing the appropriate chemical developer in a pod attached thereto. Accordingly, the means for holding the film pack also includes in addition to a container for receiving the film pack, a film transport system for advancing an exposed film sheet from the container to the exterior of the projector, and a series of pressure rollers or the like to spread the chemical solution contained within the pod along the film sheet upon the advancement of the film to facilitate the self-developing process.

The film transport system consists of an electrical motor and a series of gears and rollers to engage each successive sheet in the film pack for advancement thereof upon exposure. The mechanisms disclosed in U.S. Pat. No. 3,868,709 assigned to Polaroid Corporation and U.S. Pat. No. 4,020,499 assigned to the Eastman Kodak Company, as well as any other comparable mechanical drive means can be incorporated in and used as part of the film pack holding means of the present invention.

An important feature of the present invention is the image directing means for intercepting the image of a slide in the projection gate and creating an optical path for such image to the film surface. This can be accomplished in numerous ways depending upon the size, configuration and format of the particular slide projector which forms the basis of the device of the present invention.

In the preferred embodiment the slide projector is of the type having a slide tray receiving groove adapted to receive either a vertically disposed circular tray or a box type rectangular tray. In such configuration it is desirable to provide means to transport the image directing means between the projection position in which it is inoperative and a copy position in which it intercepts the projected image and creates a new optical path for the same to the film surface. The camera lens, or copy lens as it is also referred to herein is preferably disposed in a fixed relationship with respect to the image directing means and is movable therewith between the two positions mentioned above. The camera lens has a fixed aperture or f-stop determined in accordance with the illumination intensity of the projection lamp, the photo sensitivity of the instant print film and the shutter speed to insure the proper exposure of the film for high quality prints.

In addition, in order to conserve space the projection lens is movably mounted within the housing of the projector so that it is normally situated in a projection position which defines an optical path from the projection gate to a remote screen, but upon movement of the image directing means into a position to intercept and redirect the image of the desired slide to the film surface, the projection lens is moved out of its original position.

To accomplish the foregoing, carriage means pivotally mounted within the housing of the projector is provided and each of the image directing means, the camera lens and the projection lens are fixedly connected to such carriage means. The carriage means is movable between a slide projecting position in which the projection lens is in a position for projecting the image of a slide disposed in the projection gate on to the screen and the camera lens is in a neutral or non-image receiving position, and a print position in which the camera lens is in an intercepting position for receiving the image of the slide and directing the same to the film surface and the projection lens is in a neutral position. The image directing means comprises a reflective surface which intercepts the image of the slide either prior to or subsequent to its passage through the camera lens and redirects the path of such image to the film surface.

In a conventional projector the projection lens normally inverts and reverts the projected image so that the slide must be disposed within the projection gate in an upside down, backwards position relative to the image on the screen in order that the projected image appear in the proper manner to the viewer. The camera lens utilized for copying the slide transparency likewise inverts and reverts the image. However, the reflective surface of the image directing means again reverts the image to correct for lens reversion. The image will appear on the film upside down relative to the slide in the projection gate, but this, of course, is simply correctable by the manner in which the print is placed for viewing. In addition, by using a reflective surface to serve as the image directing means, the effective focal length of the camera lens is increased and the optical path can be directed to a convenient location within the projector, thus minimizing the size of the overall device. It must be noted that a significant difference exists between the format required for instant print film produced by Eastman Kodak Company and that produced by Polaroid Corporation. In the former the exposure area of the film faces the lens to receive the image and the print appears on the opposite face. Therefore, there is no reversion of the image and either none or an even number of reflective surfaces must be provided in the image directing means. In the latter the surface of the film which is exposed contains the image and an odd number of reflective surfaces must be utilized to correct for image reversion.

While the above-described embodiment is well suited for a projector with a vertically disposed tray format, other embodiments adapted to accomplish the same objective can also be incorporated in the same format or other format projectors. For example, an auxiliary optical path can be established from the projection bulb to the film surface via a fixed image directing means and a fixed camera lens. This, however, necessitates the use of the secondary film gate to hold a slide for which a print is desired. Suitable slide changing means can be provided to transfer a slide from the conventional projection gate to the film gate for copying purposes. Of course, the position of such auxiliary film gate is also optional and can be placed either before or after the image directing means. If it is placed after the image directing means, the image directing means in essence becomes means for reflecting the light from the projection bulb through the slide.

In another embodiment the camera lens and the projection lens can be fixedly disposed within the projector housing and image directing means in the form of a reflective device can be adapted to be interposed between the slide and the projection lens to direct the image through the camera lens either directly or by means of a further reflective device to the film surface. Suitable means can be incorporated to move such image directing means into position to effectuate the reproduction of the slide image upon the film.

In still a further embodiment means can be provided to transfer the projection bulb and the projection gate from a position in alignment with the projection lens for normal projection upon a remote screen to a position in alignment with the camera lens for exposure of the film in the film pack to thereby reproduce the image of the slide.

Further embodiments incorporating the basic concept of this invention will be apparent to those skilled in the art.

The invention is further described with reference to the annexed drawings.

DESCRIPTION OF THE PREFERRED EMBODIMENTS

Figure 1:
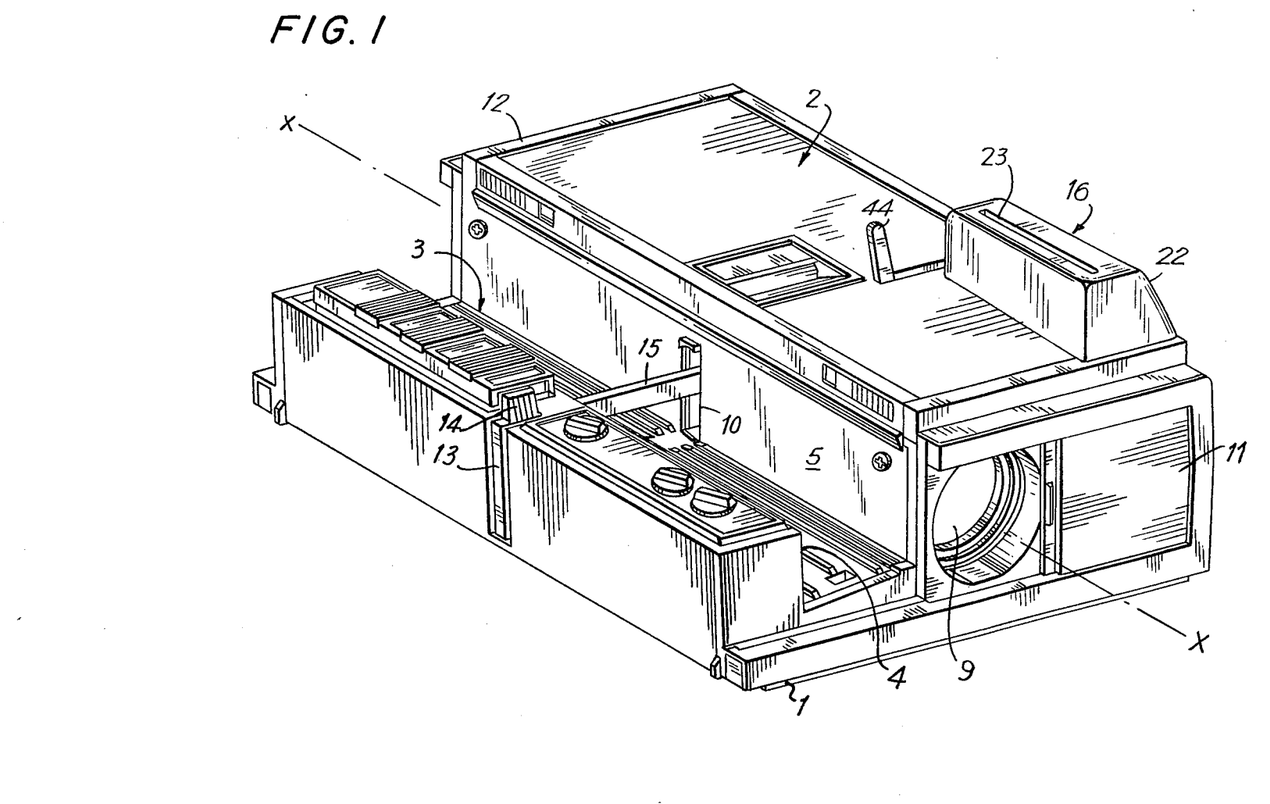
FIG. 1 is a prospective view of the preferred embodiment of the instant print slide projector of the invention.
Figure 2:
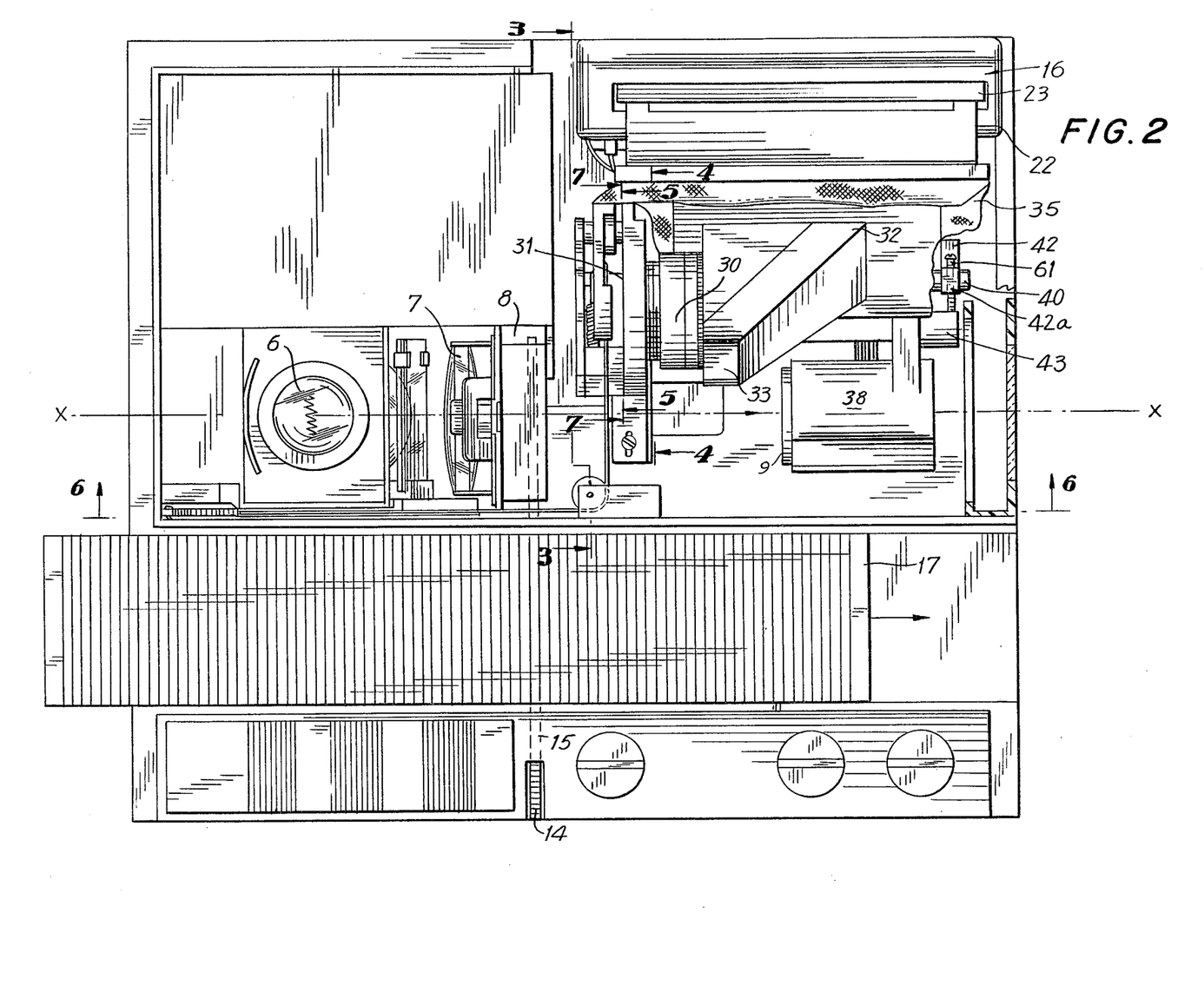
FIG. 2 is a top plan view of the slide projector shown in FIG. 1 with a portion of the top cover thereof removed, and showing a box-like slide tray employed therewith.

Referring now to FIG. 1, the instant print slide projector of the present invention includes a base plate 1 and a projector housing 2 disposed thereon. The housing 2 has a front wall 11 and a rear wall 12 and is provided with a slide tray receiving channel 3 defined by walls 4 and 5 which extends along one side thereof and is open at the top, front and rear ends. Channel 3 is adapted to interchangeably receive either box-type or vertically disposed circular slide trays in which a plurality of slides may be stored for sequential projection. In FIG. 2 a box-type tray 17 is shown in position on a slide projector.

The optical axis of the projector portion of the invention, which is located in the approximate center of housing 2, is indicated by a broken line X—X in FIGS. 1 and 2 and, as is well known in the art, in alignment therewith are a projection lamp 6, a condenser lens 7, a projection gate 8 for holding a slide transparency to be viewed and a projection lens 9.

A vertical extending slide receiving aperture 10 is formed in vertical wall 5 of tray receiving channel 3 approximately midway between front wall 11 and rear wall 12 of the projector housing 2 to permit the transfer of slides between slide tray 17 disposed in channel 3 and projection gate 8 which holds each slide in a projecting and copying position. A slide carrier or changer 13 to carry out such transfer is mounted for reciprocal sliding movement transversely of the optical axis X—X. The slide carrier 13 is of a conventional design and is characterized by a handle 14 which is disposed vertically near the edge of wall 4 of the projector housing, a pusher arm 15 which extends inwardly from the upper end of the handle toward the optical axis X—X, to transfer slides from tray 17 to the projection gate, a base plate extending beneath channel 3 (not shown) and a vertically disposed pusher member (not shown) which is secured to the base plate for returning slides to slide tray 17. Details off the slide carrier of the type employed in the projector disclosed herein are more fully described in U.S. Pat. No. 3,183,774 to Kurz. After the slide carrier has returned the previously viewed slide to the tray the tray is advanced by means which are well known in the art to place the next slide disposed therein for movement into position for viewing.

Figure 3:
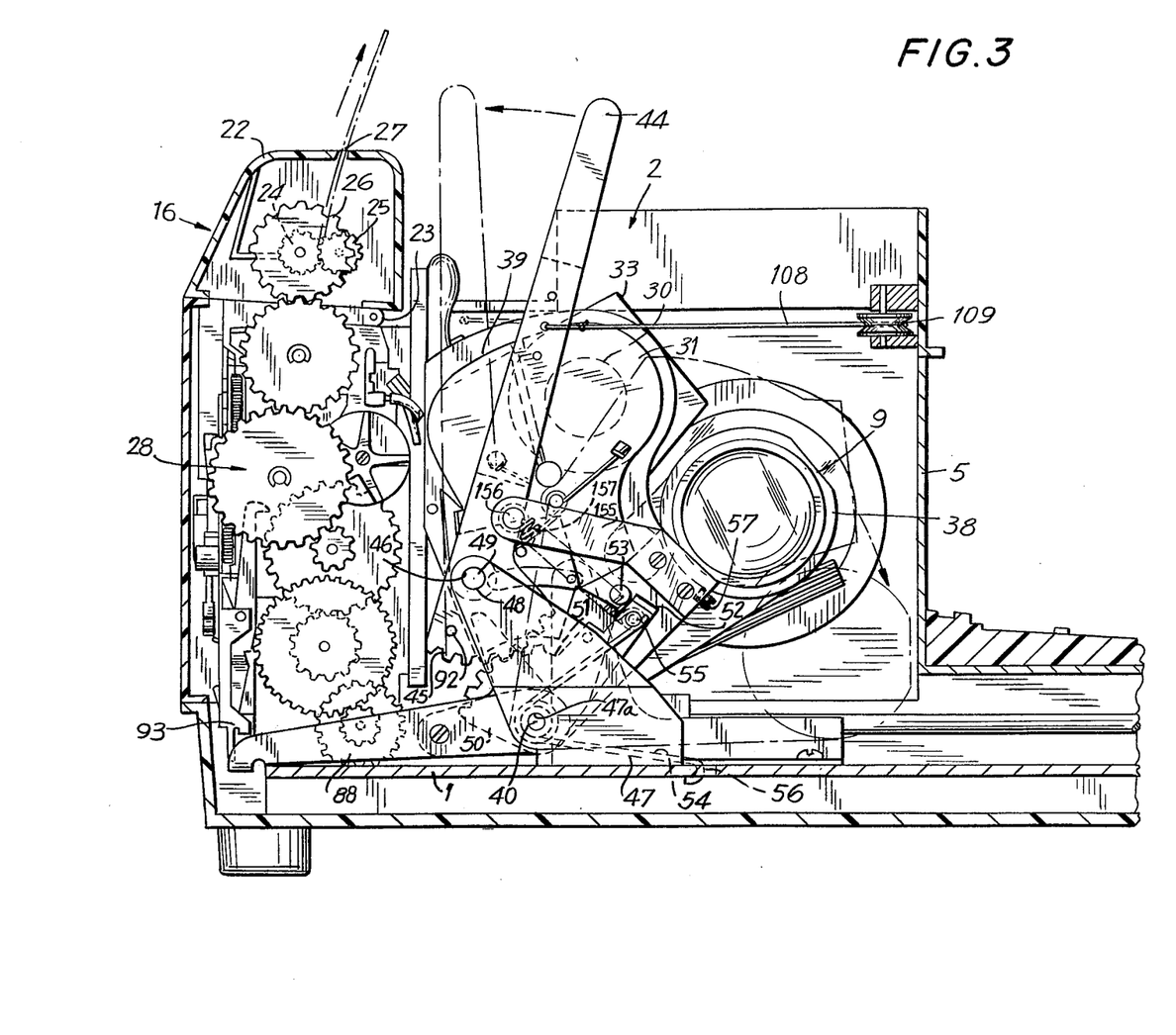
FIG. 3 is a partial cross-sectional view of the slide projector taken along the line 3—3 of FIG. 2.

A film magazine 16 is disposed on base plate 1 of housing 2 in a position parallel to the optical axis X—X. The magazine 16 is adapted to receive a self-developing photographic print film 19 which is pressed toward exposure plane 21 by at least two leaf springs 20. The magazine 167 also includes a cover 22, which is pivotally attached thereto by means of hinge 23 as shown in FIG. 3 to permit the insertion and removal of a film pack therefrom. Cover 22 has a slotted opening 27 to permit the discharge of an exposed film sheet and also includes at the interior thereof a pair of pressure rollers 24 and 25 for transporting an exposed film sheet through opening 27 and a series of drive gears 26 for rotating said rollers.

As is well known in instant print photography, each film sheet is provided with a pod containing an appropriate chemical developer for processing the print after exposure. The passage of the film sheet between rollers 24 and 25 fractures the pod and uniformly spreads the chemical solution contained therein across the film sheet to facilitate the self-developing process.

The motive force for gears 26 and rollers 24 and 25 is provided by an electric motor driven gear train system 28 shown in FIG. 3. The details of such system and its component parts, including each gear, the electric drive motor and the means for actuating the same are well known and contained in commercially available instant print cameras. As will be explained hereinafter, upon exposure of each film sheet contained within magazine 16, the film transport system for discharging an exposed sheet of film from the magazine is actuated.

Figures 7, 8:
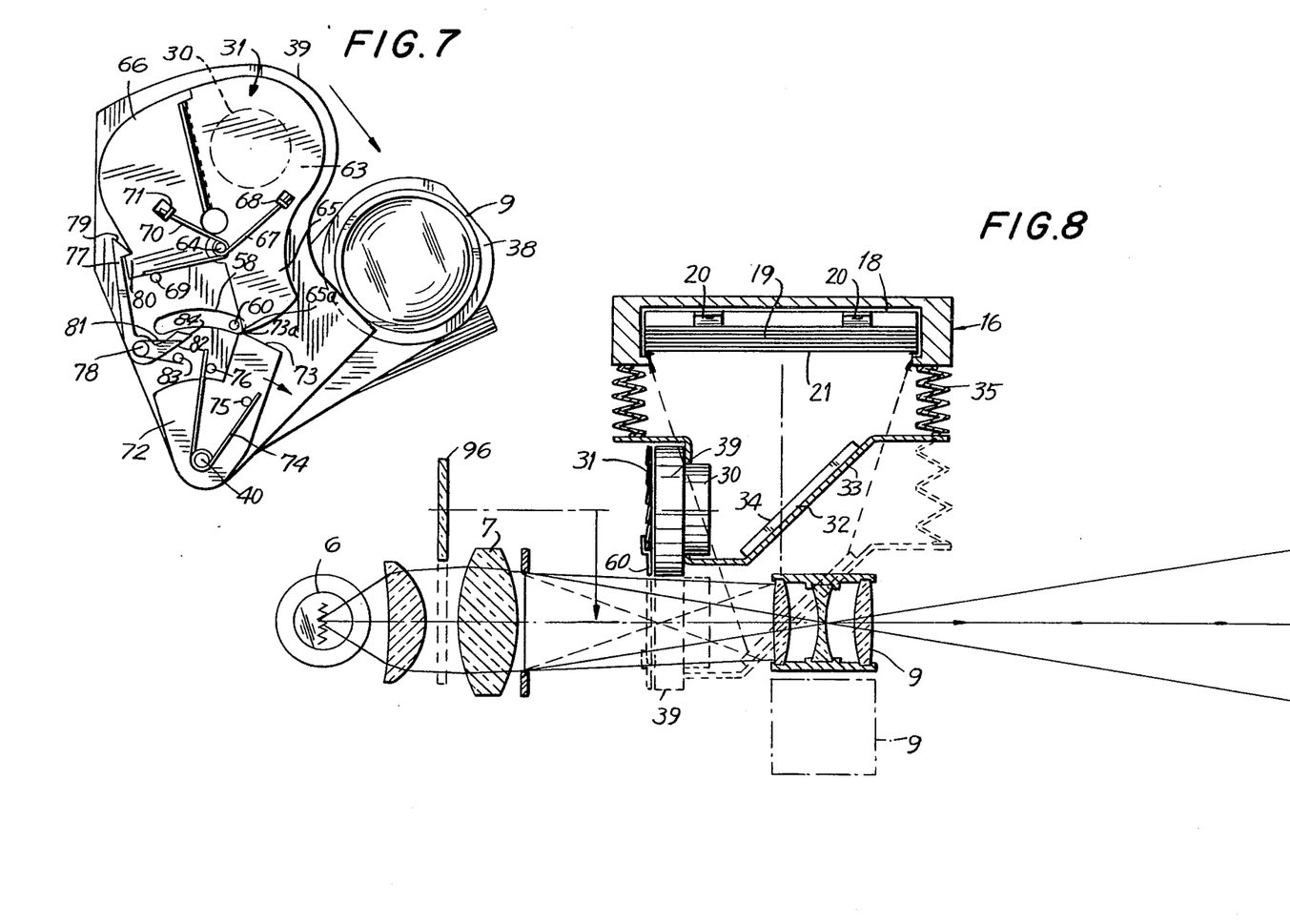
FIG. 7 is a partial cross-sectional view taken along the line 7—7 of FIG. 2.
FIG. 8 is a schematic diagram illustrating the optical system of the preferred embodiment of the invention.

A camera lens 30, which serves as a copy lens to focus a transparency image on a film sheet disposed in exposure plane 21 of magazine 16 is shown in FIGS. 2 and 8, and is mounted within the housing for selective movement between a neutral or inoperative position spaced apart from the optical axis as shown in FIG. 2, and a copy position coaxial with the optical axis, as shown by the dotted line in FIG. 8, in which lens 30 is positioned to receive the image of a slide disposed within projection gate 8. Simultaneously with the movement of camera lens 30 into the operative or copy position along the optical axis, the projection lens 9 is moved out of its operative or projection position along the optical axis into a neutral position to provide space within projector housing 2 for the movement of the camera lens and an image directing means 32, which will be described hereinafter, into the copy position. A shutter 31 is operatively disposed on a shutter plate 39 adjacent to camera lens 30 to normally prevent exposure of the film within magazine 16. The shutter plate is fixedly connected to one end of lens 30 and maintains a fixed relationship between said lens and the shutter.

Image directing means 32, comprising a light tight housing 33 and a reflective element 34 disposed at a 45° angle within housing 33, is connected to the other end of camera lens 30 and is adapted to receive and redirect all of the light passing through said lens. A bellows 35 connects housing 33 of the light directing means and magazine 16 to prevent random light from contacting unexposed film. The angular position of the reflective element 34, which is preferably in the form of a mirror, is such that it intercepts light passing through lens 30 and creates an optical path for such light to the exposure plane 21 within film magazine 16.

To facilitate the movement of the camera lens 30 together with the shutter 31 and the image directing means 32 between the neutral position and the copy position such components are fixedly disposed upon a carriage 36 which is pivotally connected to the base 1 of the projector. Projection lens 9 is disposed within a housing 38 which is also connected to the carriage 36 to permit its simultaneous movement into a neutral position upon the movement of the copying components into their operative position. The components of carriage 36 are seen best in FIG. 6. The carriage comprises a first arm 33a formed as an integral part of housing 33 of the image directing means 32, a second arm 38a formed as an integral part of housing 38 for holding projection lens 9, and shutter plate 39. Arms 33a and 38a and plate 39 are all fixedly connected to a shaft 40 which extends along the base 1 of the projector and is pivotally connected thereto by means of brackets 41 and 42. In addition, arms 33a and 38a and shutter plate 39 are secured together in a fixed relative position by an additional shaft 43 disposed above shaft 40, so all components mounted on carriage 36 will move in unison.

Figure 4:
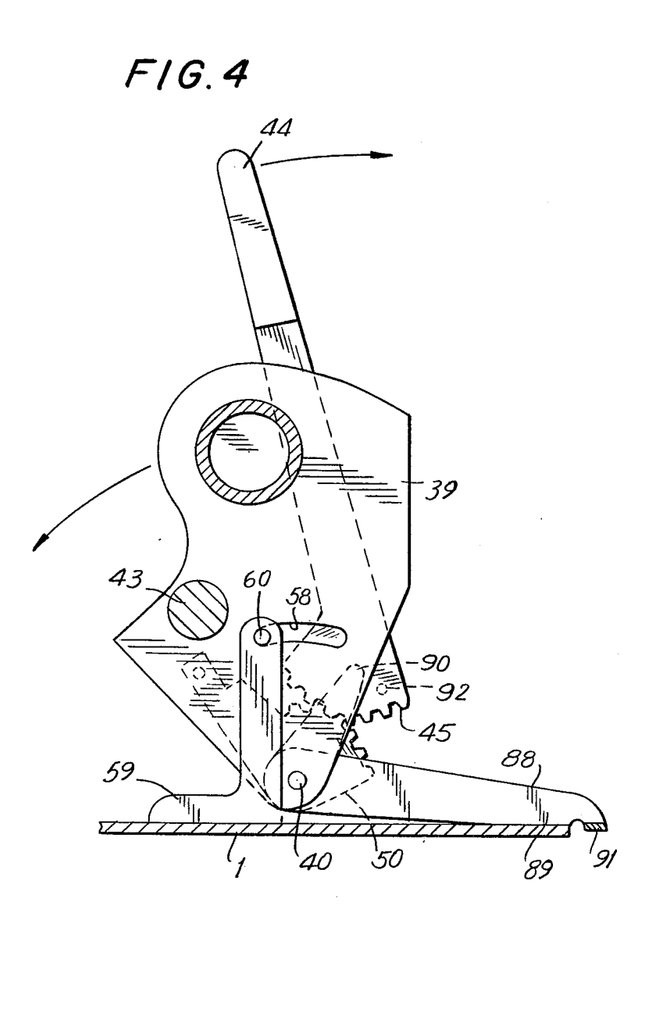
FIG. 4 is a partial cross-sectional view taken along the lines 4—4 of FIG. 2.
Figure 5:
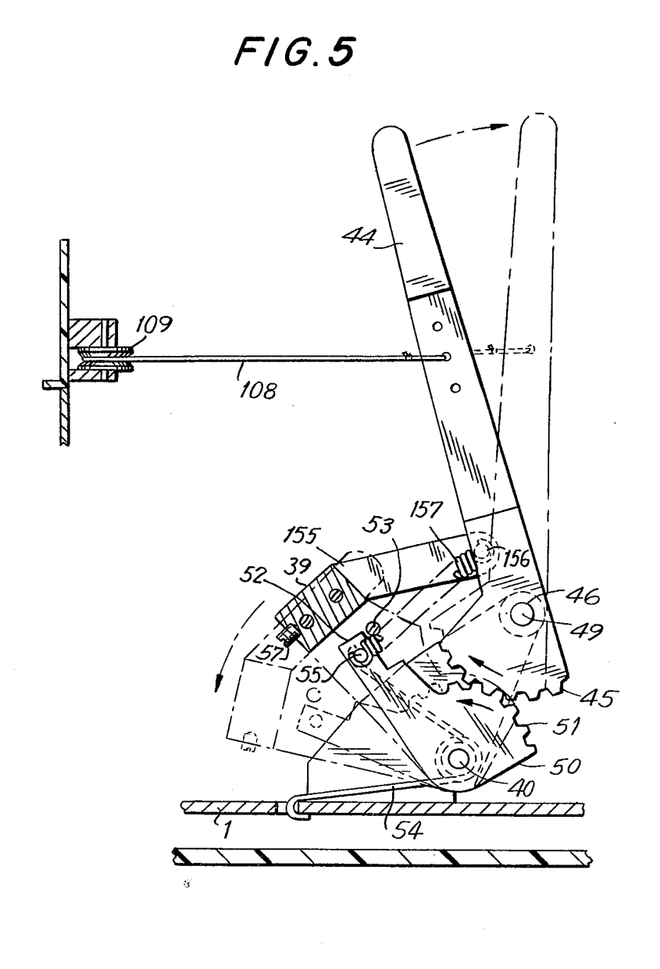
FIG. 5 is a partial cross-sectional view taken along the line 5—5 of FIG. 2.

To facilitate the pivotal movement of carriage 36 a manually operable lever 44 is pivotally connected to the projector and operatively linked to carriage 36 and shutter 31. Referring to FIGS. 3, 4 and 5, the lever comprises an elongated arm having a handle at the upper end thereof for manual operation and a gear rack 45 at the lower end thereof. The rack is disposed in a circular arc extending approximately 120 degrees. A circular opening 46 is formed in lever 44 above rack 45 and serves as the pivot point therefor. A bracket 47 having an opening 48 disposed at the upper end thereof is fixedly connected to the base 1 of the projector. A pin 49 is disposed within opening 48 of the bracket 47 and extends through opening 46 of lever 44 to permit pivotal movement thereof. A bushing (not shown) is disposed around pin 49 between bracket 47 and lever 44 to prevent scraping contact between the lever and the bracket.

It can be seen that shaft 40 for mounting the carriage 36 extends through shutter plate 39 and enages an opening 47a in the lower end of bracket 47 which further serves to hold said shaft on base 1. A partial gear 50 having a series of teeth 51 adapted to engage rack 45 of lever 44 is connected to shaft 40 for pivotal movement and is located between shutter plate 39 and bracket 47 in operative engagement with said rack. One end of partial gear 50 is formed with an extension 52. A pin 53 projects outwardly from the surface of shutter plate 39 in a position to contact an edge of extension 52 so as to limit the pivotal movement thereof. A torsion spring 54, which extends around shaft 40, has one leg thereof in operative engagement with a pin 55 projecting from extension 52 of partial gear 50. The other end of spring 54 engages an opening 56 formed in base plate 1 so that the spring 54 urges partial gear 50 into contact with pin 53, thus holding carriage 36 and all of the components mounted thereon in the projection position with projection lens 9 in alignment with the optical axis. As shown in FIGS. 3 and 5 a leg 155 extends from shutter plate 39 upwardly toward lever 44. A pin 156 projects from the upper end thereof for mounting one end of a coil spring 157. The other end of spring 157 is connected to a pin 55 extending from extension 52 of partial gear 50, and thereby holds extension 52 in contact with pin 53 throughout the travel of partial gear 50 until the shutter plate 39 reaches the copy position.

It can be seen in FIGS. 3 and 5 that housing 38 for lens 9 and housing 33 of image directing means 32 while in the projection position are located to the right of the center of shaft 40. Movement of lever 44 in the direction of the arrow in FIG. 3 rotates partial gear 50 in a clockwise direction causing it to overcome the force of spring 54 and to thereby pivotally move the carriage into the copy position.

Figure 6:
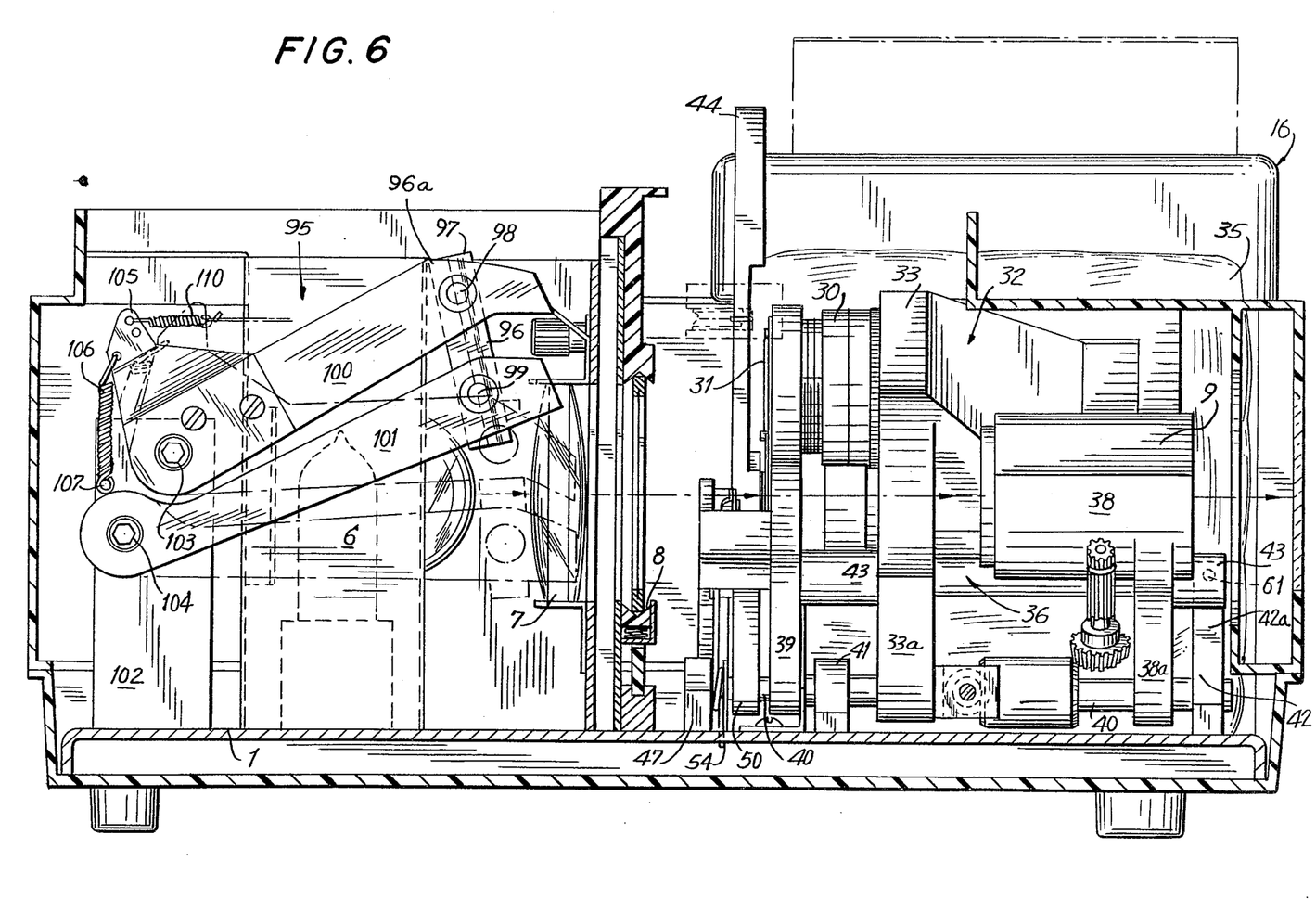
FIG. 6 is a partial cross-sectional view taken along the line 6—6 of FIG. 2.

Means are provided to finely adjust the location of the carriage in the projection position. Referring to FIGS. 2 and 6 it can be seen that bracket 42 includes an upstanding portion 42a. An adjustment screw 61 shown in FIG. 2 extends through a suitable threaded opening in the upper portion of leg 42a of bracket 42 to contact shaft 43 of the carriage 36 to properly locate the same in the projection position.

Additional means are provided to finely adjust the location of the carriage in the copy position. An adjustment screw 57 shown in FIGS. 3 and 5 extends into a threaded opening in the lower end of leg 155 to contact projector base 1 in order to properly locate the carriage in the copy position.

As noted hereinabove, upon movement of the carriage from the projection position to the copy position, shutter 31 is actuated to expose the film in magazine 16. The construction of the shutter mechanism is shown in FIG. 7, and comprises a first leaf 63 pivotally attached to shutter plate 39 by means of pin 64 and adapted to fully close lens 30. Leaf 63 includes a downwardly extending leg 65, which, as described hereinafter, is utilized for the purpose of maintaining the shutter in the closed position. A second leaf 66 is also pivotally mounted on shutter plate 39 by means of pin 64 and serves to close lens 30 after actuation of leaf 63. In the closed position leaves 63 and 66 overlap one another to insure that no light enters the lens until the shutter is actuated.

A spring 67 extends around pin 64 and engages a tab 68 on leaf 63 at one end and a pin 69 on plate 39 at the other end. The spring is adapted to urge leaf 63 in a clockwise direction into an open position. Similarly, a second spring 70 also extends around pin 65 and engages pin 69 at one end and a tab 71 disposed on leaf 66 at the other end. Spring 70 urges leaf 66 for movement in the same direction about 64.

The shutter is held in its closed position against the force of springs 67 and 70 by means of a trigger bracket 72 which is pivotally disposed about shaft 40. The trigger includes a retaining surface 73 adapted to engage the lower edge of leg 65 of leaf 63 to retain leaf 63 in the closed position. Bracket 72 is urged in a counterclockwise direction into the position shown in FIG. 8 by means of a spring 74, which extends around shaft 40 and engages a pin 75 disposed on bracket 72 and a second pin 76 disposed on shutter plate 39. In addition to holding spring 74, pin 75 extends outwardly from bracket 72 and engages a suitable opening in partial gear 50 so that such gear 50 and bracket 72 pivot together in unison upon movement of lever 44. It should also be noted that pin 76 retains bracket 72 in the position shown relative to leg 65.

A latch member 77 is pivotally mounted on shutter plate 39 by means of a pin 78. A hook-like projection 79 is disposed at one end thereof and is adapted to engage a corresponding projection 80 formed on leaf 66 of the shutter to hold such leaf in the position shown against the force of spring 70. A spring 81 extends around pin 78 and engages a tab 82 on latch 77 and a pin 83 on shutter plate 79 so as to urge the latch into engagement with leaf 66.

To actuate the shutter, lever 44 is moved manually to position carriage 36 in the copy position at which point set screw 57 in the bottom of leg 155 contacts base 1 to stop the movement thereof in the correct copy position. Continued movement of lever 44, however, imparts additional movement to half gear 50 which in turn pivotally moves trigger bracket 72 in a clockwise direction as shown in FIG. 8 overcoming the force of spring 74. When the corner 73a of surface 73 of bracket 72 passes the lower corner 65a of leg 65 of leaf 63, leaf 63 is released and spring 67 moves the same to open and permit the passage of light through lens 30. The pivotal movement of the leaf 63 continues until leg 65 contacts the lower surface 84 of latch 77. The force exerted by spring 67 upon leaf 63 is greater than the holding force of spring 81 on latch 77 so that upon contact of surface 84 by leg 65 latch 77 is rotated about pin 78 in a counterclockwise direction, thus disengaging hook 79 from projection 80. As this occurs spring 70 moves leaf 66 of the shutter in a clockwise direction to once again prevent the passage of light to lens 30 and to come into overlapping engagement with leaf 63.

Upon release of lever 44 spring 54 returns the carriage 36 including shutter plate 39 to the projection position. Pin 60, mounted upon bracket 59 and extending through arcuate opening 58 in shutter plate 39, thereupon engages leg 65 in FIG. 8 at which point retaining surface 73 of bracket 72 engages leg 65 to retain the shutter in its closed position.

After exposure of a sheet of film located in exposure plane 21 of magazine 16, drive mechanism 28 is actuated to discharge the exposed sheet of film from opening 27 of cover 22. This is accomplished by means of an actuating arm 88 shown in FIGS. 3 and 4. The arm 88 is essentially L-shaped and includes an elongated, horizontally disposed section 89 having a tab 91 extending at a right angle from the distal end thereof and a vertically disposed portion 90. The actuating arm is pivotally mounted on shaft 40 and located between bracket 47 and partial gear 50. A pin 92 is disposed in the lower portion of lever 44 immediately above rack 45. It can be seen that movement of lever 44 will bring pin 92 into contact with vertical portion 90 of the actuating arm 88, thus pivotally moving horizontal section 89 and tab portion 90 in an upward (counter-clockwise as seen in FIG. 4) direction.

A corresponding actuating bracket 93 of drive mechanism 28 of the film transport system is positioned in magazine 16 to be contacted by tab 91 upon the upward movement thereof. As this occurs, bracket 93 is likewise moved in an upward direction and thereby serves to actuate the drive mechanism and thereby discharge a sheet of film and commence the developing process.

In order to insure that the appropriate colors of the slide transparency image will be reproduced accurately on the print film it is necessary to utilize a color correction filter to be interposed between the projection lamp and the projection gate during the copying mode. This is accomplished by means of a movable color correction filter assembly 95 shown primarily in FIG. 6. The filter assembly comprises a color correction filter 96 and a diffuser 96a held in a suitable frame 97 which is pivotally connected by means of pins 98 and 99 to the ends of pivot arms 100 and 101. A mounting block 102 is fixedly disposed on base 1 of the projector and pivot arms 100 and 101 are pivotally connected thereto by means of connectors 103 and 104, respectively. The relative positions of the pivot points for arms 100 and 101 is such that upon pivotal movement thereof, filter 96 will be disposed in a vertical position between lamp 6 and objective lens 7 to insure proper filtration of the light emitted by said lamp. Arm 100 has an L-shaped section 105 which generally extends upwardly therefrom. A coil spring 106 is connected at one end to L-shaped 105 and at the other end to a pin 107 extending outwardly from mounting block 102. Spring 106 serves to urge the filter assembly 96 into the position shown in FIG. 6 wherein the filter is out of the optical path.

Referring now to FIG. 3, it can be seen that a cable 108 is connected to a midpoint of lever arm 44. The cable 108 extends around a pulley 109 mounted on the inside of wall 5 of the projector housing and is connected at the other end thereof via a coil spring 110 to L-shaped section 105 of arm 100. Movement of lever 44 from the projection position to the copy position causes cable 108 to overcome the force of spring 106 and thereby pivotally moves filter 96 into operative position on the optical axis.

In operation, a slide tray is installed in channel 3 of the projector housing and a pack of instant print self-developing film is installed in magazine 16. The projector is then energized to provide power to illuminate projection lamp 6 and a slide is transferred from the tray to the projection gate 8. Such slide is projected via projection lens 9 on a remote screen. The projection process continues by projecting the same or different slides from the tray on the screen until it is desired to make a permanent print of any desired slide. When that occurs the operator actuates the copying portion of the invention by moving lever 44 to transfer the carriage 36 from the projection position to the copy position wherein copy lens 30 and image directing means 32 are disposed along the optical axis X—X of the projector in a position to receive the image of the slide. At the same time filter 96 and light diffusing element 96a are moved into position between the projection bulb and the objective lens to illuminate the slide with color corrected light having reduced illumination adjusted to film sensitivity. Continued movement of lever 44 actuates shutter 31 to expose a film sheet in plane 21 of magazine 16. Upon actuation of the shutter actuating arm 88 contacts bracket 93 to energize the film transport mechanism 28 to discharge the exposed sheet of film from the magazine and commence the self-developing process. Upon release of lever 44 spring 54 returns it and the carriage 36 to the projection position so that the slide contained within gate 8 is once again illuminated upon the screen. This process can be repeated to obtain additional prints of the same slide or of any other slide disposed within the projection gate at any time during the viewing process. While the foregoing embodiment is desirable due to its compact nature and its resultant ability to fit into a conventional size slide projector, other embodiments within the scope of the invention for accomplishing the same operation can also be utilized. For example, referring to FIG. 9, another embodiment of the instant print slide projector of the invention is shown schematically, and comprises a projection lamp 112, condenser lenses 113, a projection gate 114, and a projection lens 115, all of which are in alignment with the optical axis for the projection portion of the invention. A second optical axis for the copy portion of the invention which is parallel to and spaced apart from the projection optical axis has in alignment therewith a copy lens 116 and a film magazine 117. A conically shaped housing 118 is provided to prevent ramdom light from contacting the film within magazine 117.

Figure 9:
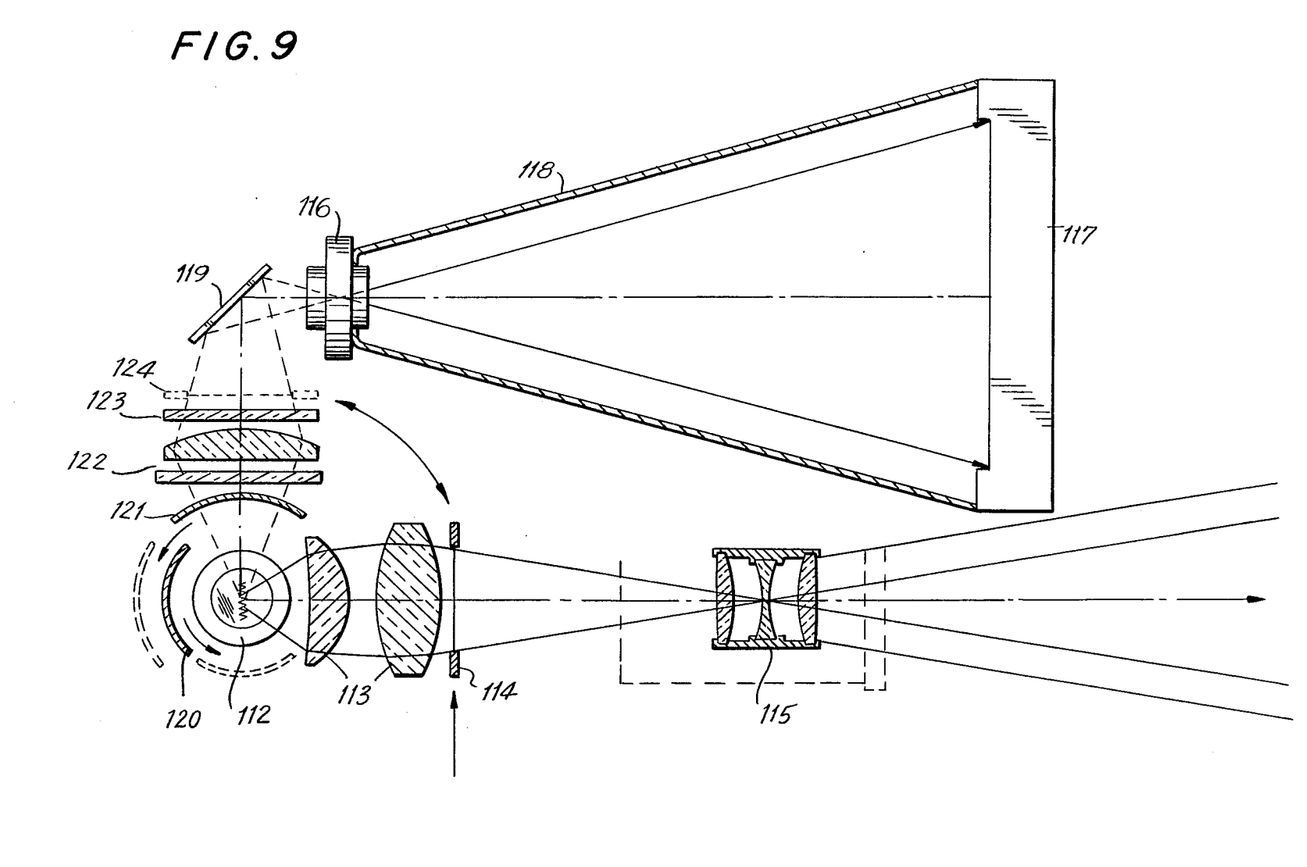
FIG. 9 is a schematic diagram illustrating the optical system of an alternate embodiment of the invention.

The image directing means in this embodiment comprises a fixed reflective element 119 which creates an optical path from the projection bulb 112 through lens 116 to the film in magazine 117. The image directing means also includes a movable concave reflective element 120 and a light shield 121. In the projection position as shown in FIG. 9, reflective element 120 directs the light emitted from lamp 112 through condenser lenses 113 along the projection optical axis to project the image of a slide in gate 114 on a screen, and shield 121 prevents light from contacting reflective element 119. In the copy position, reflective element 120 and shield 121 are rotated to the positions represented by the dotted line, so that the light from bulb 112 is directed through a secondary condenser lens system 122, a color correction filter 123 and a gate 124 for holding a slide during the copying process. The image of such slide is reflected by means of element 119 through lens 116 to the surface of the film contained within magazine 117. A shutter (not shown), of course, is provided in conjunction with lens 116 to control the exposure of the film. Suitable mechanical means are provided to simultaneously transfer a slide from projection gate 114 to copy gate 124 and transfer reflective element 120 and light shield 121 between the projection and copy position. The details of such mechanical components will be apparent to those skilled in the art.

Figure 10:
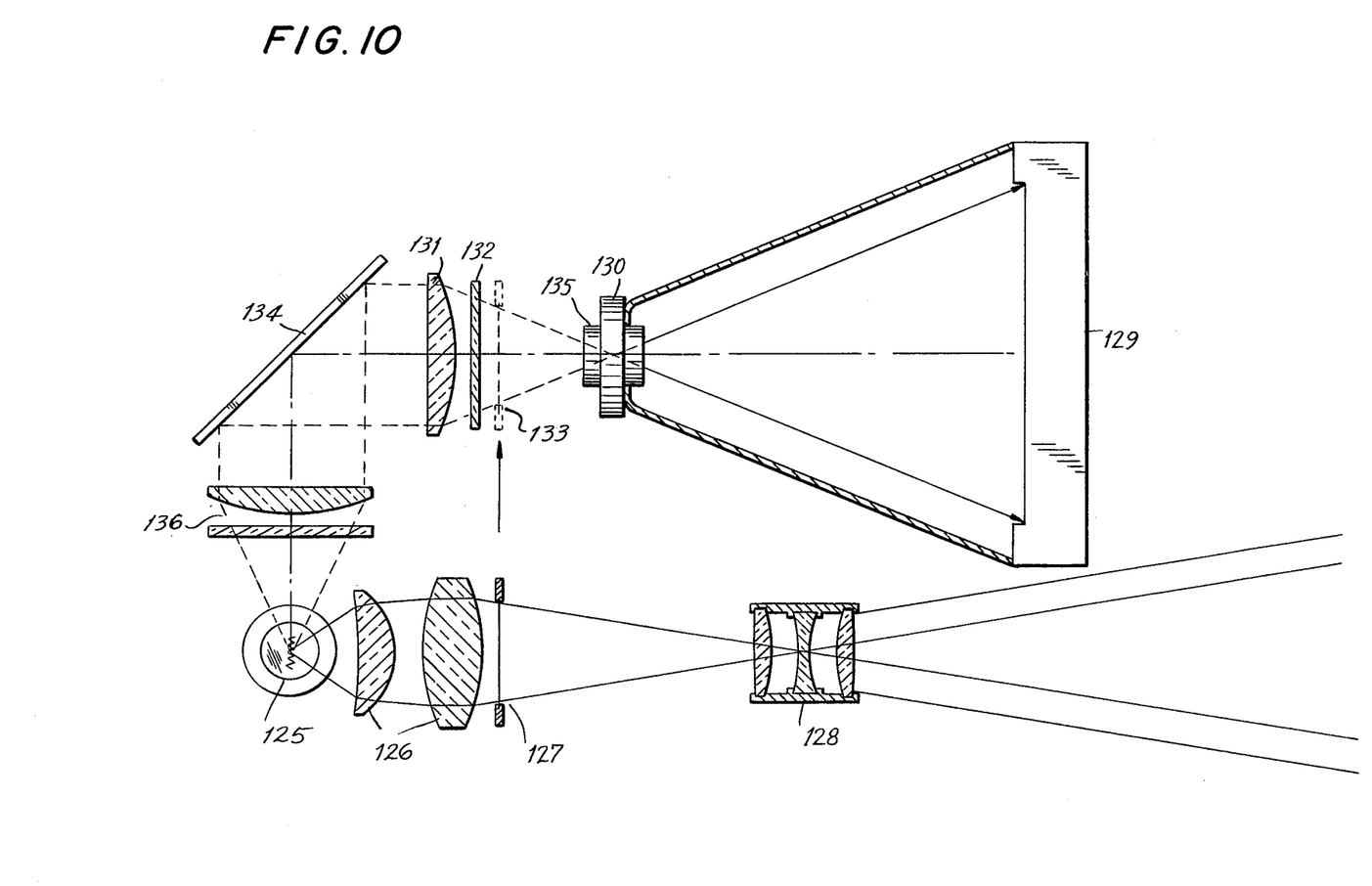
FIG. 10 is a schematic diagram illustrating the optical system of a further embodiment of the invention.

In FIG. 10 a further embodiment of the instant print slide projector of the invention is shown schematically. In this embodiment the projection aspect of the invention is defined by a projection lamp 125, condenser lenses 126, a gate 127 for holding a slide and a projection lens 128. The copy portion of the invention includes a film magazine 129, a copy lens 130, a condenser lens element 131, a color correction filter 132 and a gate 133 for holding a slide to be copied. Also in this embodiment a fixed image directing means in the form of a reflective element 134 is provided. In the projection mode light from lamp 125 passes through condenser lens 126, projection gate 127 and projection lens 128 to project the image of a slide contained within the gate upon a remote screen. In the copy mode means are provided to transfer a desired slide from gate 127 to gate 133 and to thereupon actuate a shutter 135 associated with lens 130. Light then passes through a copy condenser lens system 136 and is directed to the copy optical axis by means of reflective element 134 defining the image directing means. The light then passes through condenser lens 131, filter 132, a slide disposed within gate 133, and copy lens 139 which focuses the same on the film surface contained within magazine 129 to duplicate the desired image. Here again the means for transferring a slide from gate 127 to gate 133 and actuating the shutter will be apparent to those skilled in the art in view of the disclosure herein.

Figure 11:
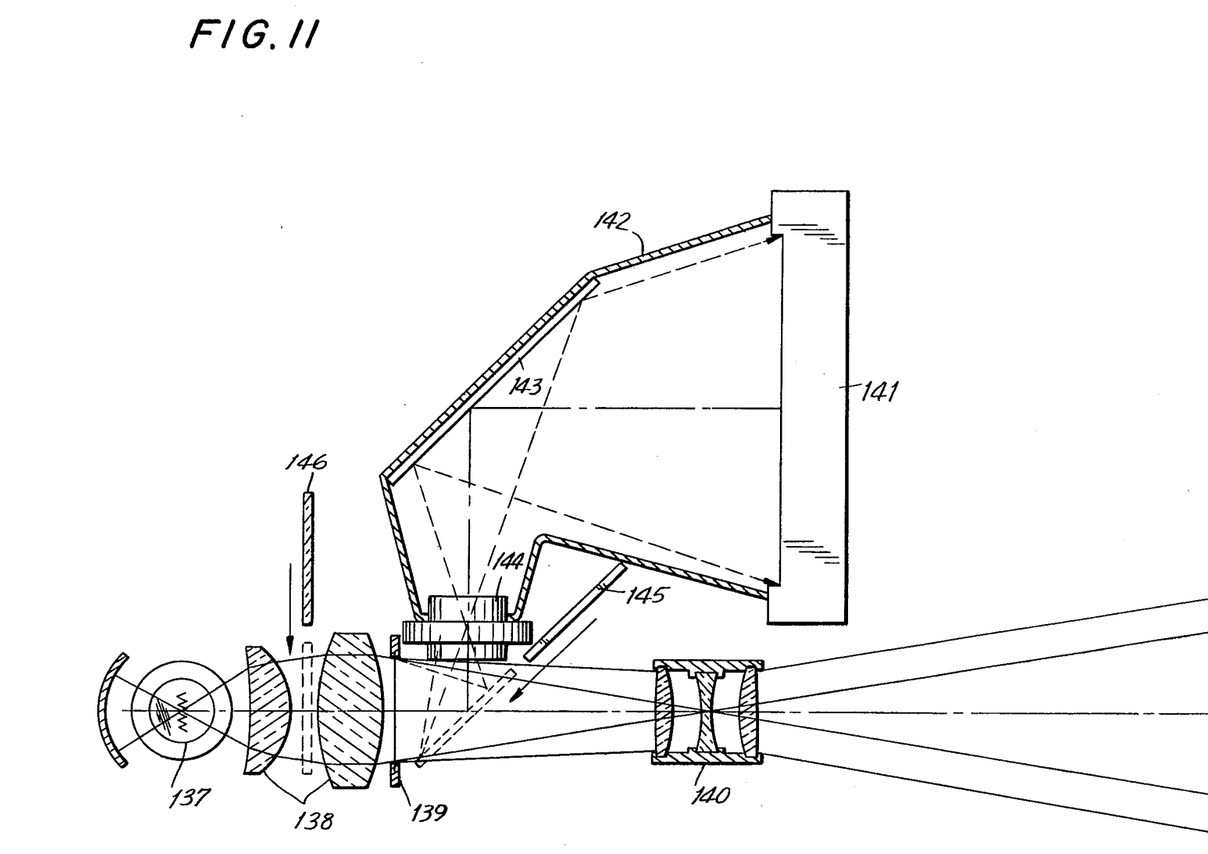
FIG. 11 is a schematic diagram illustrating the optical system of still another embodiment of the invention.

An additional embodiment of the invention is shown in FIG. 11, wherein the slide projection portion of the invention as in the other embodiments comprises a lamp 137, a condenser lens system 138, a gate 139 for holding a slide and a projection lens 140. The copy components include a film magazine 141, a housing 142 containing a fixed, reflective element 143 which defines a portion of the image directing means and a copy lens 144 disposed at one end of housing 142 in a position at right angles to film magazine 141. The remaining portion of the image directing means comprises a reflective element 145 selectively movable from a projection position as shown in FIG. 11 to a copy position in which the light passing through a slide contained within gate 139 is intercepted and redirected through lens 144 to reflective element 143 from which it is redirected to the surface of a film sheet contained within magazine 141. Simultaneously with the movement of reflective element 145 into a position to intercept the image, the color correction filter 146 is interposed between the two elements of condenser lens 138 and a shutter (not shown) is actuated to expose the film. The mechanical means necessary to transfer reflective element 145 and filter 146 between the projection and copy positions and to actuate the shutter will be apparent to those skilled in the art.

Figure 12:
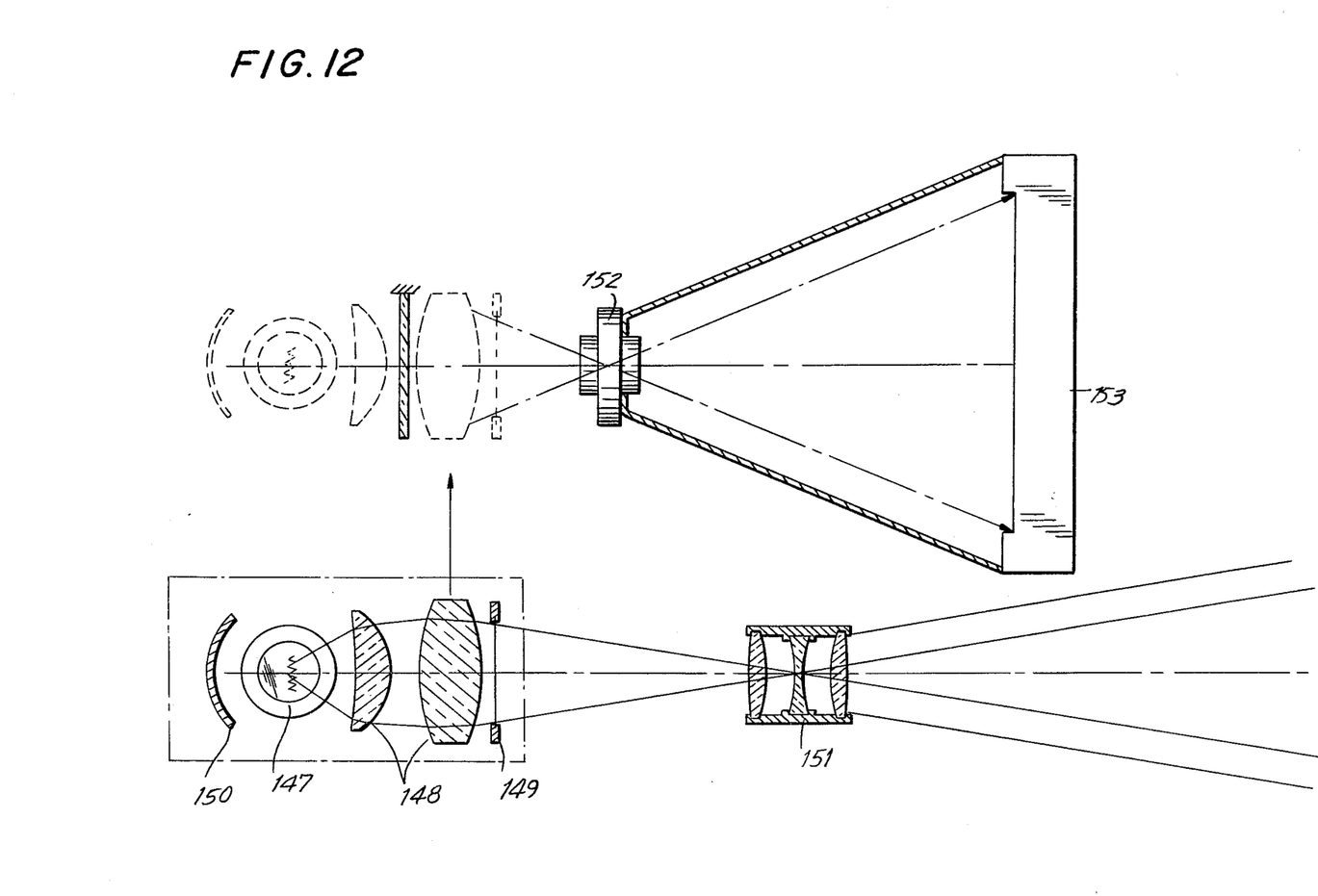
FIG. 12 is a schematic diagram illustrating the optical system of an additional embodiment of the invention.

In FIG. 12 a further embodiment of the invention is shown schematically. In this case a projection lamp 147, condenser lenses 148, a projection gate 149 and a light reflector 150 constitute a single unit which is movably disposed within the projector for movement between a projection position, as shown, in alignment with a projection lens 151 to project an image upon the screen and a copy position shown by the dotted lines in which the image of the slide is focused by copy lens 152 upon the surface of film contained within a magazine 153.

It will be apparent to those skilled in the art that other embodiments as well as variations and modifications of the embodiments described herein are available that will fall within the scope and extent of this invention.

What is claimed is:

1. An instant print slide projector for sequentially displaying a plurality of photographic images on a remote screen one at a time, and selectively copying one or more of said images on self-developing photographic print film comprising, in combination, a housing having means to receive a slide tray adapted to hold a plurality of photographic slide transparencies; a projection gate disposed within the housing for receiving slide transparencies from a slide tray; means for sequentially transporting each slide between a tray disposed on the housing and the projection gate; a projection lamp disposed within the housing to illuminate a slide within the projection gate and defining therewith an optical axis; a magazine disposed in the housing in a position spaced apart from the optical axis for holding a pack of instant print photographic film; a projection lens movably disposed within the housing between a projection position on the optical axis for focusing the image of a slide in the projection gate on a remote screen and a neutral position spaced apart from the optical axis; a copy lens mounted within the housing for movement between the copy position disposed on the optical axis for focusing the image of a transparency within the projection gate on the photo-sensitive surface of film in the magazine and a neutral position spaced apart from the optical axis; image directing means operatively connected to the copy lens for creating an optical path to the film surface in the copy position; a shutter disposed in a position to normally prevent the passage of light through the copy lens; a carriage means pivotally mounted in the housing on which is mounted the projection lens, the copy lens, the image directing means and the shutter for their simultaneously movement between the projection position and the copy position; and a spring-urged actuating lever to normally hold the carriage slide projection position, operatively connected to the carriage means to effectuate such movement and activate the shutter in the copy position.

2. An instant print slide projector for sequentially displaying a plurality of photographic images on a remote screen one at a time, and selectively copying one or more of said images on self-developing photographic print film comprising, in combination, a housing having means to receive a slide tray adapted to hold a plurality of photographic slide transparencies; a projection gate disposed within the housing for receiving slide transparencies from a slide tray; means for sequentially transporting each slide between a tray disposed on the housing and the projection gate; a projection lamp disposed within the housing to illuminate a slide within the projection gate and defining therewith an optical axis; a magazine disposed in the housing in a position spaced apart from the optical axis for holding a pack of instant print photographic film; a projection lens movably disposed within the housing between a projection position on the optical axis for focusing the image of a slide in the projection gate on a remote screen and a neutral position spaced apart from the optical axis; a copy lens mounted within the housing for movement between the copy position disposed on the optical axis for focusing the image of a transparency within the projection gate on the photo-sensitive surface of film in the magazine and a neutral position spaced apart from the optical axis; image directing means operatively connected to the copy lens for creating an optical path to the film surface in the copy position; a shutter disposed in a position to normally prevent the passage of light through the copy lens; a carriage means pivotally mounted in the housing on which is mounted the projection lens, the copy lens, the image directing means and the shutter for their simultaneously movement between the projection position and the copy position; and an actuating lever operatively connected to the carriage means to effectuate such movement and activate the shutter in the copy position, a color correction filter is disposed in the housing in operative engagement with the actuating lever for movement into a position on the optical axis between the projection lamp and the projection gate upon movement of the copy lens into the copy position.

3. An instant print slide projector for sequentially displaying a plurality of photographic images on a remote screen one at a time, and selectively copying one or more of said images on self-developing photographic print film comprising, in combination, a housing having means to receive a slide tray adapted to hold a plurality of photographic slide transparencies; a projection gate disposed within the housing for receiving slide transparencies from a slide tray; means for sequentially transporting each slide between a tray disposed on the housing and the projection gate; a projection lamp disposed within the housing to illuminate a slide within the projection gate and defining therewith an optical axis; a magazine disposed in the housing in a position spaced apart from the optical axis for holding a pack of instant print photographic film; a projection lens movably disposed within the housing between a projection position on the optical axis for focusing the image of a slide in the projection gate on a remote screen and a neutral position spaced apart from the optical axis; a copy lens mounted within the housing for movement between the copy position disposed on the optical axis for focusing the image of a transparency within the projection gate on the photo-sensitive surface of film in the magazine and a neutral position spaced apart from the optical axis; image directing means operatively connected to the copy lens for creating an optical path to the film surface in the copy position; a shutter disposed in a position to normally prevent the passage of light through the copy lens; a carriage means pivotally mounted in the housing on which is mounted the projection lens, the copy lens, the image directing means and the shutter for their simultaneously movement between the projection position and the copy position; and an actuating lever operatively connected to the carriage means to effectuate such movement and activate the shutter in the copy position, the carriage also comprises a shutter plate disposed in a plant perpendicular to the optical axis and having an opening therein for receiving an end of the copy lens, a mounting hold for pivotal connection to the housing of the projector, and means for mounting the shutter in a position to cover the lens opening; a housing for the image directing means having a mounting bracket for pivotal connection to the housing of the projector; a lens opening for holding the opposite end of the copy lens; a housing for holding the projection lens having a mounting bracket for pivotal connection to the housing; and a shaft to interconnect the shutter plate, the housing for the image directing means and the projection lens housing and maintain a fixed relationship therebetween.

4. An instant print slide projector in accordance with claim 3, further comprising a shaft fixedly connected to the carriage components and rotatably connected to the projector housing to facilitate pivotal movement of the carriage; said components being juxtaposed in respect of said shaft in a manner such that their weight creates a moment about the shaft which pivotally urges the carriage toward the copy position.

5. An instant print slide projector in accordance with claim 4, further comprising a spring disposed about the shaft in operative engagement with the carriage; said spring having a rotational force greater than the moment to hold the carriage in the projection position against the weight of its components.

6. An instant print slide projector in accordance with claim 5, further comprising a mechanical linkage between the actuating lever and said spring to move the spring against its force upon movement of the lever into the copy position to permit the moment to move the carriage into the copy position simultaneously therewith.

7. An instant print slide projector in accordance with claim 6, in which the mechanical linkage is operatively connected to the shutter for actuation thereof after movement of the carriage into the copy position.

8. In a slide projector of the type adapted to display a plurality of photographic transparencies on a screen external of the slide projector one at a time by means of a projection lens, the improvement comprising means for selectively printing the image from one or more of said transparencies on instant print photographic film, comprising, in combination, means for holding a pack of said film, a copy lens for selectively focusing the image from the transparency on the instant print film, a shutter to normally close the copy lens, carriage means for mounting the projection lens, the print lens and the shutter; said carriage means being selectively movable between a first position in which a first independent adjustable optical system comprising a projection lens is juxtaposed to focus the transparency image upon the external screen and a second position in which a second independent adjustable optical system comprising copy lens is juxtaposed to focus the transparency image of the instant print film; and means in operative engagement with the carriage means to actuate the shutter to expose the film upon movement of said carriage means to the copy position as well as to discharge a photographic copy.

* * * * *